US012321983B2

(12) United States Patent
Arora et al.

(10) Patent No.: US 12,321,983 B2
(45) Date of Patent: *Jun. 3, 2025

(54) ADJUST ADS AUCTION USING PREDICTED USER RESPONSE TO AN IN-AD SURVEY

(71) Applicant: GOOGLE LLC, Mountain View, CA (US)

(72) Inventors: Shilpa Arora, Sunnyvale, CA (US); Colin McCulloch, Half Moon Bay, CA (US); Niyati Yagnik, Mountain View, CA (US); Creighton Thomas, Mountain View, CA (US); Manohar Prabhu, Palo Alto, CA (US); Timothy Lipus, Sunnyvale, CA (US); Michael Eugene Aiello, Hoboken, NJ (US); Yi Zhang, Sunnyvale, CA (US); Ajay Kumar Bangla, San Jose, CA (US); Bahman Rabii, San Francisco, CA (US); Gaofeng Zhao, Los Altos, CA (US); Yingwei Cui, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,422

(22) Filed: Jul. 2, 2024

(65) Prior Publication Data

US 2024/0354839 A1 Oct. 24, 2024

Related U.S. Application Data

(63) Continuation of application No. 17/074,132, filed on Oct. 19, 2020, now Pat. No. 12,062,085, which is a
(Continued)

(51) Int. Cl.
*G06Q 30/00* (2023.01)
*G06F 16/2457* (2019.01)
(Continued)

(52) U.S. Cl.
CPC ....... *G06Q 30/08* (2013.01); *G06F 16/24578* (2019.01); *G06F 16/951* (2019.01); *G06F 16/958* (2019.01); *G06N 20/00* (2019.01)

(58) Field of Classification Search
CPC ... G06Q 30/08; G06F 16/958; G06F 16/2458; G06F 16/951; G06N 20/00
See application file for complete search history.

(56) References Cited

U.S. PATENT DOCUMENTS 8,255,293 B1 8/2012 Davies
2007/0208724 A1 9/2007 Madhavan et al.
(Continued)

OTHER PUBLICATIONS

Ragunathan, Thirumalaisamy, et al. "Advertisement posting based on consumer behaviour." Procedia Computer Science 50 (2015): 329-334.*
(Continued)

*Primary Examiner* — Kathleen Palavecino
(74) *Attorney, Agent, or Firm* — MARSHALL, GERSTEIN & BORUN LLP

(57) ABSTRACT

A method and system for adjusting ads auction using predicted user responses to an in-ad survey is provided. The method includes (1) providing a content item associated with an actionable object, which when selected, causes a computing device to present a plurality of interactive elements each corresponding to a different one of a plurality of reasons for restricting the content item; (2) receiving, from the computing device, data indicating a particular reason, of the plurality of reasons, for restricting the content item, and the particular reason corresponding to a particular interactive element, of the plurality of interactive elements, that was selected by the user; and (3) updating, using the received data, a content selection model for selecting content items, wherein the content selection model is associated with the user.

20 Claims, 5 Drawing Sheets

Related U.S. Application Data continuation of application No. 16/280,716, filed on Feb. 20, 2019, now Pat. No. 10,817,931, which is a continuation of application No. 14/836,537, filed on Aug. 26, 2015, now Pat. No. 10,223,742.

(51) Int. Cl.
*G06F 16/951* (2019.01)
*G06F 16/958* (2019.01)
*G06N 20/00* (2019.01)
*G06Q 30/08* (2012.01)

(56) References Cited

U.S. PATENT DOCUMENTS

| | | |
|---|---|---|
| 2009/0216639 A1 | 8/2009 | Kapczynski et al. |
| 2009/0327032 A1 | 12/2009 | Gunawardana et al. |
| 2015/0020086 A1 | 1/2015 | Chen et al. |
| 2016/0299973 A1 | 10/2016 | Oakeson |
| 2016/0342288 A1 | 11/2016 | Konik et al. |
| 2017/0061332 A1 | 3/2017 | Cardonha et al. |
| 2017/0155737 A1 | 6/2017 | Jannink et al. |
| 2021/0064690 A1 | 3/2021 | Li et al. |

OTHER PUBLICATIONS

Aiello, Michael, "More control with 'mute this ad' [x] icon", Inside AdSense, Google, Jul. 2, 2012, retrieved May 14, 2015 from URL: http://adsense.blogspot.com/2012/07/more-control-with-mute-thisad-x-icon.html (4 pages).

Murdock et al., "Method for matching electronic advertisements to surrounding context based on their advertisement content", abstract, retrieved Oct. 17, 2018 from URL: https://search.proquest.com/printviewfile?accountid=14753 (2 pages).

Non-Final Office Action for U.S. Appl. No. 14/836,537 dated Jun. 11, 2018 (16 pages).

Notice of Allowance for U.S. Appl. No. 14/836,537 dated Oct. 23, 2018 (11 pages).

Notice of Allowance for U.S. Appl. No. 16/280,716 dated Jun. 24, 2020 (10 pages).

* cited by examiner

ADJUST ADS AUCTION USING PREDICTED USER RESPONSE TO AN IN-AD SURVEY

CROSS-REFERENCE TO RELATED APPLICATIONS

This application is a continuation of and claims priority under 35 U.S.C. § 120 to U.S. patent application Ser. No. 17/074,132, filed Oct. 19, 2020, titled "Adjust Ads Auction Using Predicted User Response to an in-Ad Survey," which claims priority under 35 U.S.C. § 120 to U.S. patent application Ser. No. 16/280,716, filed Feb. 20, 2019, titled "Systems and Methods for Selecting Third Party Content Based on Feedback," which claims priority under 35 U.S.C. § 120 to U.S. patent application Ser. No. 14/836,537, filed Aug. 26, 2015, titled Systems and Methods for Selecting Third Party Content Based on Feedback" which are incorporated herein by reference in their entirety.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

The present disclosure is generally directed to selecting third party content using electronic content selection infrastructure. In some implementations, the electronic content selection infrastructure can adjust the ranking or pricing of online content items in an online content item auction on feedback. The feedback can be received via survey or otherwise determined via an indication of positive or negative sentiment for the third party content (e.g., closing a window with the third party content or ignoring the third party content). For example, when content items such as advertisements are displayed on a webpage, a data processing system can provide a survey along with the advertisement to solicit feedback signals. The feedback signals can indicate a negative signal or a positive signal. For example, a negative signal may indicate a dislike for an advertisement, a level of annoyance with the advertisement. The data processing system can aggregate the feedback signals received from multiple advertisements impressions and corresponding surveys. The data processing system can further aggregate information associated with each advertisement impression and feedback signal, including, e.g., information about the web page, information about the advertisement or information about or associated with the computing device on which the web page is displayed. With this information, the data processing system can train a machine learning model that can be used to predict, for a given combination of features, a score associated with an advertisement impression. The score may indicate a predicted signal, such as a predicted dislike or annoyance with the advertisement. For example, the score can indicate a likelihood that a viewer of the advertisement responds negatively to the advertisement.

The data processing system can use this score to adjust a ranking of the advertisement in a real-time online advertisement auction. For example, the real-time online advertisement auction may initially rank candidate advertisements based on a quality score, relevancy score, predicted click through rate, bid price, etc. The real-time online advertisement auction may then adjust the ranking based on the score indicating a level of dislike or annoyance. Further, the data processing system can adjust a price a content provider pays for the advertisement based on the score. For example, the data processing system can compare the score of a highest ranked advertisement in the auction with a score of the second highest ranked advertisement, and adjust the price of the highest ranked advertisement based on the comparison.

At least one aspect is directed to a method of selecting content (e.g., third party content such as advertisements or other third party content to be placed in a content slot on a web page) using electronic content selection infrastructure. The method can include a content selector executed by a data processing system receiving, via a computer network, a request for content for display with a web page on a computing device. The method can include the content selector identifying a plurality of candidate content items including a first candidate content item and a second candidate content item responsive to the request. The method can include a machine learning engine executed by the data processing system determining a first feature of the first candidate content item. The method can include the machine learning engine determining a second feature of the second candidate content item. The method can include the machine learning engine determining a third feature corresponding to at least one of the web page and the computing device associated with the request. The method can include the machine learning engine generating a first query based on a first combination of the first feature and the third feature. The method can include the machine learning engine generating a second query based on a second combination of the second feature and the third feature. The method can include the machine learning engine determining, responsive to the first query, a first score for the first candidate content item based on a machine learning model generated using historical signals received from a plurality of computing devices via a metadata channel formed from an electronic feedback interface (or electronic survey interface). The method can include the machine learning engine determining, responsive to the second query, a second score for the second candidate content based on the machine learning module. The method can include the content selector selecting, for display with the web page on the computing device, the first candidate content item based on a comparison of the first score and the second score. The method can include a bidding module executed by the data processing system determining a price for the first candidate content item based on a difference between the first score of the first candidate content item and the second score of the second candidate item. The method can include the bidding module providing an indication of the price to a content provider of the first candidate content item.

The data processing system can provide, to the computing device, an instance of the electronic feedback interface responsive to displaying the first candidate content item. The data processing system can receive, via metadata channel formed from the instance of the electronic feedback interface, a signal. The signal can be input via the computing device. The machine learning engine can update the machine learning model based on the signal, the first feature and the third feature.

The data processing system can determine feedback using various techniques or mechanisms including, e.g., based on browsing, scrolling, or viewing activity associated with the third party content. In some embodiments, the data processing system provides an instance of the electronic feedback interface (or electronic survey interface) at least partially overlaid on the first candidate content item displayed with the web page on the computing device. The instance of the electronic survey interface can include at least one of an input text box, input button, or input drop down menu. In some embodiments, the data processing system can receive, from the plurality of computing devices, the historical signals in response to instances of the electronic survey interface provided with previously displayed content items. The machine learning engine can generate the machine learning model using the historical signals and corresponding features.

The data processing system can determine an initial ranking of the first candidate content item and the second candidate content item in an online content item auction. The online content item auction can be initiated in response to the request. The first candidate content item can rank lower than the second candidate content item in the initial ranking. The data processing system can increase a rank of the first candidate item based on the first score and the second score. The first candidate content item can be a highest ranking content item in the online content item auction.

The data processing system can generate the machine learning model using, for example, a supervised machine learning technique such as a neural network, linear regression technique, a Bayesian estimator, decision tree learning, association rule learning, artificial neural networks, inductive logic programming, support vector machines, clustering, Bayesian networks, reinforcement learning, representation learning, similarity and metric learning, sparse dictionary learning, genetic algorithms, logistic regression, linear regression, Monte Carlo analysis, autoregressive integrated moving average ("ARIMA"), directly using average mute rates, or naive Bayes. In some cases, at least one of the historical signals includes a dislike signal comprising a binary value. In some cases, the first feature includes at least one of a keyword, a topic, a content provider, a content selection criterion, or a content vertical. In some embodiments, the third feature includes at least one of a keyword of the web page, a topic of the web page, a domain name of the web page, a location of the computing device, a profile associated with the computing device, or historical browsing activity associated with the computing device.

In some embodiments, the data processing system can convert the first score to a first monetary unit based on a first estimated loss of revenue. The first estimated loss of revenue can include or take into account a loss of long term revenue. The data processing system can convert the second score to a second monetary unit based on a second estimated loss of revenue using one or more conversion technique. For example, the data processing system can determine the price based on a difference between the first monetary unit and the second monetary unit.

Another aspect is directed to a system for selection of content using electronic content selection infrastructure. The system can include a data processing system comprising one or more processors and memory. The data processing system can include a content selector, machine learning engine, and bidding module. The content selector can receive, via a computer network, a request for content for display with a web page on a computing device. The content selector can identify a first candidate content item and a second candidate content item responsive to the request. The machine learning engine can determine a first feature of the first candidate content item. The machine learning engine can determine a second feature of the second candidate content item. The machine learning engine can determine a third feature corresponding to at least one of the web page and the computing device associated with the request. The machine learning engine can generate a first query based on a first combination of the first feature and the third feature. The machine learning engine can generate a second query based on a second combination of the second feature and the third feature. The machine learning engine can determine, responsive to the first query, a first score for the first candidate content item based on a machine learning model generated using historical signals received from a plurality of computing devices via a metadata channel formed from an electronic survey interface. The machine learning engine can determine, responsive to the second query, a second score for the second candidate content based on the machine learning module. The content selector can select, for display with the web page on the computing device, the first candidate content item based on a comparison of the first score and the second score. The bidding module can determine a price for the first candidate content item based on a difference between the first score of the first candidate content item and the second score of the second candidate item. The bidding module can provide an indication of the price to a content provider of the first candidate content item.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
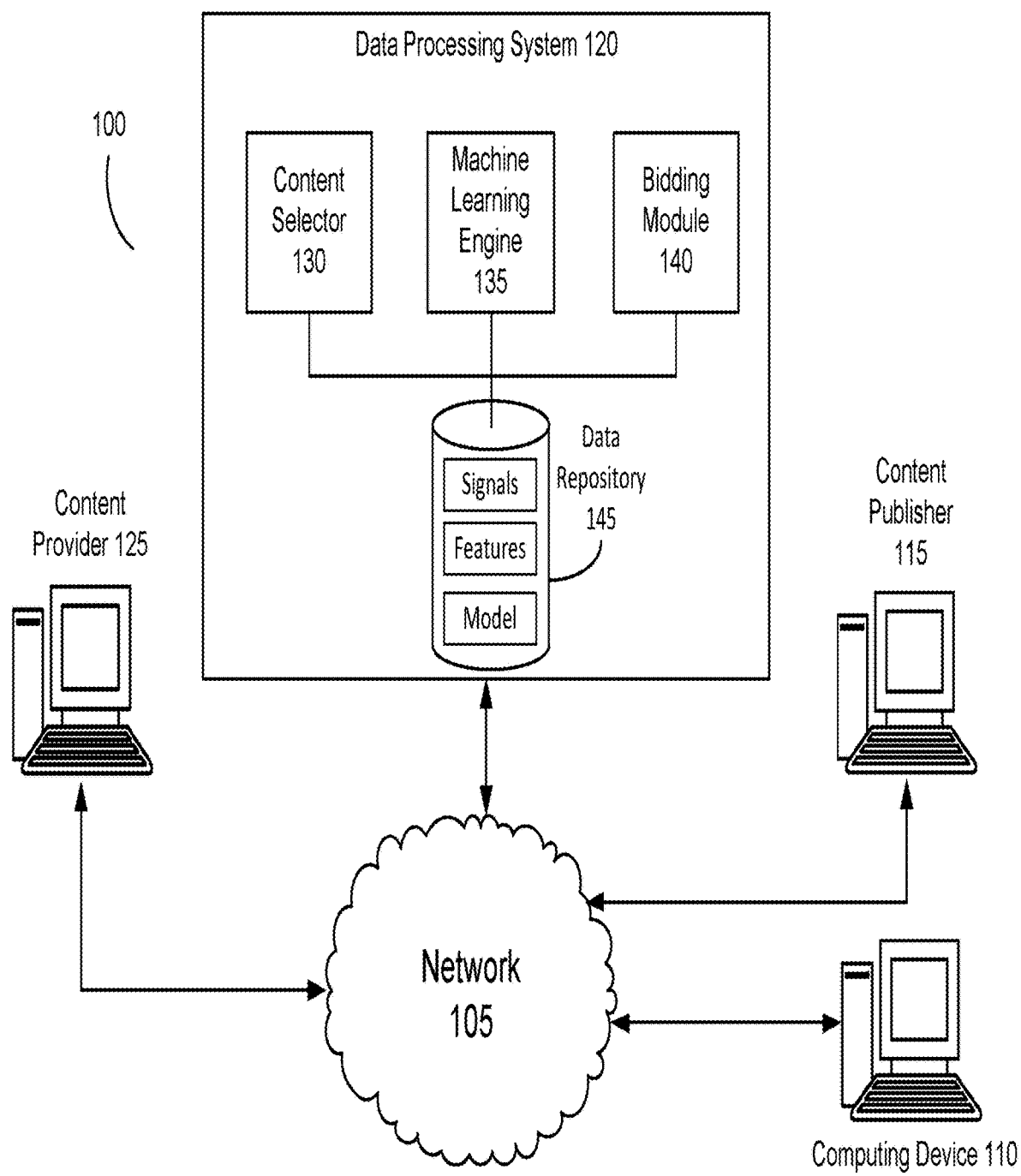
FIG. 1 depicts a system to select content based on survey feedback received via a computer network in accordance with an implementation.

Systems and methods described herein relate generally to selecting content (e.g., content items such as electronic documents or online electronic advertisements) based on survey feedback. For example, systems and methods of the present disclosure can adjust the ranking and pricing of advertisements in an online auction based on a user feedback received from a survey presented via an historical advertisement impression.

A data processing system may initiate a real-time (e.g., responsive to a request for content for display on a computing device) online content item auction. In the online content item auction, the data processing system can analyze or process a value that a content item may bring to a content publisher (e.g., the website on which the content item is to be displayed) or an administrator or entity maintaining the online content item auction when scoring candidate content items to select a content item for display. The online auction of the present solution further consider a likelihood of annoyance or dislike associated with candidate content items or a request for content when selecting the content item, which can impact revenue. Thus, the data processing system can be configured to penalize or otherwise adjust the pricing or selection of content items that may have a higher likelihood of being disliked in order to improve or optimize revenue.

To improve or optimize revenue, the data processing system can receive, from a plurality of computing devices, feedback signals associated with content items. The data processing system can aggregate the feedback signals to generalize the feedback and improve the electric content selection infrastructure, online user interface, online user experience, or efficiency of the online selection infrastructure. For example, the present solution can improve a click through rate or conversion rate, which reduces the number of content item impressions that occur prior to receiving a selection in the content item, thereby improving the efficiency of the content selection infrastructure by reducing the amount of computing resources, network resources, and memory resources used to generate an online content item selection or conversion.

The data processing can improve the online experience by using electronic feedback signals received from computing devices to adjust the online content item auction. The data processing system can generate, maintain, create, or train machine learning models that can predict a feedback signal based on historical, previous or past feedback signals. The machine learning model can be generated using one or more features, including, e.g., an online publisher's electronic document or webpage, a web property (e.g., domain, website, social media site, online blog, etc.), content provider information, content item information, profile information associated with a computing device, profile information associated with or voluntarily provided by a user of the computing device, type of computing device, operating system, content selection criteria (e.g., keyword used to select the content item), etc. The data processing system can change, adjust, modify, or alter an auction score of a content item according to a likelihood that a feedback signal for the content item will be negative. The adjustment may lead to a new auction ranking; e.g., content items the data processing system expects or predicts to be less annoying, that is get less negative feedback as measured by the survey, may perform as well or better compared to content items predicted to receive more negative feedback signals. Based on this adjustment, the data processing system can select a content item with a lower bid price and lower predicted annoyance to win an auction over a content item with a higher bid price but higher predicted negative feedback signal.

In some cases, the data processing system can be configured to initiate a second price online real-time content item auction. In the case of a second price auction, or any other type of auction where the price may depend on other competitors bids, pricing can change as a result of this adjustment. The data processing system can be configured with one or more techniques to adjust the pricing. In one example, the data processing system can set a price for the highest ranking content item that is selected for display via the auction (e.g., the winning content item) to be the bid provided by the content provider when a content item with a lower, or smaller predicted negative feedback signal (but not the highest bid) wins or is selected over a content item with a higher predicted negative feedback signal and higher bid. In another example, the data processing system can adjust the price using a function of the negative feedback score of both the winner and the runner up (and possibly other bidders) and use the result of this to adjust the price to be paid. For example, the function can include a difference, product, exponential function, or ratio of the two scores.

The data processing system can generate an electronic survey (or feedback) interface to obtain feedback signals for content items. The data processing system can generate various types of electronic survey interfaces, and may adjust or determine a score based on the type of electronic survey interface. The data processing system can generate the model for any level or levels of feedback. The data processing system can use the same or different features in one or more models, and the strength and type of adjustment may vary among them. Thus, the data processing system can use various features, models and techniques to predict a feedback signals based on an electronic survey to adjust the ranking and pricing of content items in an online real-time content item auction. The data processing system can also determine, identify, or obtain feedback using other techniques, such as based on browsing behavior or viewing behavior changing determined based on tracking viewing activity of a webpage, biometric sensors such as eye tracking, input/output tracking, etc.

In an illustrative implementation, the system provides a content item for display with a web page. The system can provide an electronic survey to the user in which the user can input feedback related to the content item. The system may provide the survey responsive to user interaction with the content item, responsive to the impression, responsive to a user's request to provide feedback, etc. The survey may include a question or other request for feedback regarding the content item. The feedback may be in the form of binary feedback. For example, the question can be "Was this content item relevant to you?" The feedback options may include a "yes" button and a "No" button. In some cases, the system can provide additional prompts or questions to receive feedback as to why the user believes the content item is relevant or not relevant.

The system can further determine, identify, detect or otherwise obtain features associated with the content item or the impression of the content item. Features can include, e.g., time of day, subject matter of the web page on which the content item is displayed, keywords used to select the content item, information about the computing device (e.g., type of computing device, operating system, geographic location), content provider, etc. The system can input the feedback received from the user and the features associated with the content item impression into a machine learning model. The machine learning model can correlate feedback with features to determine which combination of features is correlated with positive feedback or negative feedback. The system can use the model to determine or predict the likelihood that a user will dislike a content item or like the content item.

The system can then receive a new request for an advertisement. Responsive to the request, the system can identify a plurality of candidate advertisements. The system can further determine features associated with the advertisement request. The system can compare the features associated with the request with features associated with the plurality of candidate advertisements to predict a likelihood of interest in each of the advertisements.

The system can score or rank the advertisements based on the likelihood of interest. The system can further adjust the pricing of the advertisement based on the likelihood of interest. For example, the system can penalize advertisements that are predicted to be annoying to the user. For example, a content provider who wins an auction, but whose content item is predicted to have a higher likelihood of annoyance or dislike to the user, may have to pay more to win the auction than a content provider with a content item associated with a higher likelihood of interest.

FIG. 1 illustrates an example system 100 for selecting content based on feedback signals using electronic content selection infrastructure. The system 100 can include content selection infrastructure. The system 100 can include a data processing system 120 communicating with one or more of a content provider 125, content publisher 115 or computing devices 110a-n (also referred to as computing device 110) via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. The content publisher 115 may publish or provide the main content of a webpage, while a content provider 125 can provide third party content such as advertisements for display in content slots alongside the main content of a webpage provided by the content publisher 115. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115, and at least one content provider computing device 125. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous-one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can also include at least one content selector 130, at least one machine learning engine 135, at least one bidding module 140, and at least one data repository 145. The content selector 130, machine learning engine 135 and bidding module 140 can each include at least one processing unit or other logic device such as programmable logic array engine, or module configured to communicate with the database repository or database 145. The content selector 130, machine learning engine 135, bidding module 140, and data repository 145 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The request may include a query such as a search query input into a search engine of the data processing system or other system. The input query may include text, characters, symbols, etc. The data processing system 120 may receive the input query from a computing device 110 via network 105. The input query may include audio (e.g., words spoken by a user of the computing device 110 and input into the search engine of the data processing system via network 105 and an interface). The request may include or be associated with information that facilitates selecting content responsive to the request. The information may include, e.g., contextual information about an electronic document, web page, electronic application, or organic, non-advertisement link on which the selected content is to be displayed. The data processing system 120 may provide an interface displaying input text boxes, buttons, drop downs, or other widgets through which a user of a client can select or otherwise indicate a category for the search.

Responsive to the search query or other request for content (e.g., third party content, third party content to be provided for display in a content slot alongside main content provided by the content publisher, electronic advertisements), the data processing system 120 (e.g., via content selector 130) can identify, select or otherwise obtain content to be provided or presented via the computing device 110 making the request, or some other computing device 110 associated with the request for content. In some implementations, the data processing system 120 may identify, select, or otherwise obtain content without receiving a request for content. The content may include, e.g., text, characters, symbols, images, video, audio, or multimedia content. The content item may include an advertisement in the form of a sponsored link (e.g., provided by content providers) included by the search engine (e.g., via content selector) for display in the search engine results page. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content (e.g., advertisement) responsive to the search query or with search results. In some instances, a web page may request content from the data processing system 120 responsive to a user of a mobile device 110 visiting the web page (e.g., via a mobile device 110).

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 may identify multiple content items (e.g., a first candidate content item, a second candidate content item, third candidate content item, etc.) that are responsive to the request for content, or are otherwise candidates for display on an online document (e.g., a web page or a page of an online marketplace). The data processing system may initiate or utilize an online content item auction process to select one or more of the multiple content items for display on the online document. An auction system may determine two or more bids (e.g., monetary bids, point bids, token bids) for content items to be displayed in an online document. The auction system can run the bids through an auction process to determine one or more winning bids. Content items corresponding to the winning bids or highest ranking bids may be selected for display on or with the online document.

The data processing system 120 may include a content selector 130. The content selector 130 may analyze, parse, or otherwise process subject matter of web page or the candidate content items to determine whether the subject matter of the candidate content items correspond to the web page. The content selector 130 may identify, analyze, or recognize terms, characters, text, symbols, or images of the web page or candidate content items using an image processing technique, character recognition technique, or database lookup. The candidate content items may include metadata indicative of the subject matter of the candidate content items, in which case the content selector 130 may process the metadata to determine whether the subject matter of the candidate content item corresponds to the web page.

Content providers may provide additional indicators when setting up a content campaign that includes content items. The content provider may provide information at the content campaign or content group level that the content selector 130 may identify by performing a lookup using information about the candidate content item. For example, the candidate content item may include a unique identifier, which may map to a content group, content campaign, or content provider. The content selector 130 may determine, based on information stored in data repository 145 about the content provider (e.g., advertiser), that the candidate content item is relevant or matches a request for a content item, subject matter provided via a web page with which the content item is to be displayed, or a search query input by a computing device. The content selector 130 may select the content item based on network activity information, browsing history information, profile information etc. associated with the computing device 110 that initiated the request for the content item or the computing device 110 that is to display the content item.

In some cases, the content selector 130 can perform an initial content selection process or technique to identify candidate content items, and a machine learning engine 130 can perform a further content selection process or technique to facilitate content selection or adjust a content selection process or technique of the content selector 130. For example, the content selector 130 can identify an initial (or first or baseline) set of candidate content items that are candidates for display with a webpage response. The content selector 130 may identify the set of candidate content items based on content selection criteria established by a content provider, including, e.g., keywords, geographic information, profile information, etc. The data processing system 120 can also use information associated with the request for content, such as keywords or topics of the webpage with which the content item is to be displayed, information about the computing device, etc. For example, the data processing system 120 can identify candidate content items by filtering from a plurality of available content items to generate a subset of filtered candidate content items that are candidate content items for display with the webpage. The data processing system 120 can then provide the candidate content items to the machine learning engine 135 to perform further selection techniques or processing to select a content item. For example, the content selector 130 may initiate an online real-time auction with candidate content items. Prior to, during, or subsequent to initiation of the online real-time auction, the content selector 130 can access, interface, or communicate with the machine learning engine 135. The data processing system 120, upon identifying the candidate content items, can perform additional processing or additional selection techniques to select the content item for display. In some implementations, the content selector 130 can use a model generated or maintained by the machine learning engine 135 to facilitate selecting content.

To perform additional content selection processes or techniques, or adjust, alter or change a content selection process or technique of the content selector 130 (e.g., a real-time online auction), the data processing system 120 can include a machine learning engine 135 designed and constructed to facilitate selecting online content items via a real-time online content item auction. The machine learning engine 135 can work with, integrate with, or interface with the content selector 130. The content selector 130 can initiate a call via an Application Programming Interface to the machine learning engine 135 to facilitate content selection. The content selector 130 can pass to, instruct, query, provide or otherwise interface with the machine learning engine 135 to communicate information associated with the online real-time auction. The data processing system 120 (e.g., via machine learning engine 130) can further select one or more content items from the plurality of candidate content items for display with an online document (e.g., a webpage) on a computing device 110. To select content items from the plurality of candidate content items, the data processing system 120 can obtain various information or data associated with the webpage, the computing device 110, or candidate content items. For example, the data processing system 120 can obtain information or data indicative of features of the webpage, computing device, or candidate content items. The data processing system 120 can obtain a feature data structure with information that facilitates content selection. The feature data structure can be stored or maintained in data repository 145. The data processing system 120 can query the data repository 145 for feature information. The feature data structure stored in data repository 145 can include one or more feature entries. The data repository 145 can include several feature data structure, or a feature data structure including several feature entries.

For example, the data repository 145 can include a feature data structure (or webpage feature data structure) that includes feature information for the webpage such as a domain name of the webpage, a website, topics (e.g., news, politics, entertainment, sports, music, business, fashion, video, blog, educational, shopping, etc.), vertical, type of webpage, concepts, timestamp (e.g., when the webpage was last updated or published), rating (e.g., profanity, level of profanity, adult content, maturity rating, appropriateness of other content), multimedia content, multimedia scripts, platforms or graphics, interactive scripts, etc. The webpage feature data structure can further include information about the content slot for which a content item is requested, such as a size or dimensions of the content slot (e.g., length× width in pixels or other units), position (e.g., position in pixels), position indicator (e.g., above the fold or below the fold of a viewable area on a display of the computing device), position relative to publisher content (e.g., right, left, above, below), type of content slot (e.g., banner advertisement, popup window, embedded advertisement, search advertisement), etc.

The data processing system 120 can also obtain features associated with each candidate content item. For example, a feature data structure associated with a candidate content item can include content selection criteria (e.g., keywords, phrases, entities, geographic location, or profile characteristics) used to select the candidate content item. The content selection criteria may be provided by a content provider 125, or otherwise associated with the candidate content item. The candidate content item feature data structure may include keywords, topics, concepts, or vertical information associated with the candidate content item. A vertical (or more than vertical) of the candidate content item may refer to an industry associated with the candidate content. For example, an advertisement for a shoe may be in the clothing vertical; an advertisement for flights to Las Vegas may be in the travel vertical or also in the entertainment vertical. The candidate content item feature data structure may further indicate the content provider or vertical of the content provider. The candidate content item feature data structure may further include a rating (e.g., appropriateness, maturity rating, profanity, etc.) of the candidate content item.

The data processing system 120 can also obtain features associated with the computing device 110 on which the content item is to be displayed or otherwise provided. For example, a computing device feature data structure can include a location of the computing device, time of day, a profile associated with the computing device, profile information associated with or voluntarily provided by a user of the computing device and stored in the data repository, a type of computing, operating system of the computing device, historical browsing activity associated with the computing device, mode of transportation of the computing device (e.g., walking or driving), environmental information, etc. In some implementations, the data processing system 120 can determine a computing device feature data structure by identifying or determine a type of computing device. The type of computing device may include, for example, mobile device, mobile telecommunications device, desktop computer, laptop computer, tablet, smartphone, electronic book reader, smartwatch, wearable computing device, gaming device, television set top box, digital media player, microconsole. The type of computing device may further indicate, for example, an operating system, available resources, device information, etc.

The geographic location can be determined using sensor information received from the computing device 110. For example, location information can be provided or determined via one or more of a global positioning sensor configured on the computing device, WIFI or cell phone tower triangulation, internet protocol address, beacon technology, prompt via a user interface for location information, etc. Mode of transportation can be determined via sensors of the computing device, such as an accelerometer or gyroscope, as well based on subsequent pings with the location information. The data processing system 120 can determine profile information or historical browsing activity based on associating a unique identifier with the computing device, and accessing a database (e.g., data repository 145) with profile information associated with the unique identifier. For example, historical web browsing activity can be associated with the unique identifier of the computing device, such as a username, anonymous randomly generated identifier, IP address, etc. In some cases, the data processing system 120 can include a geographic location module designed and constructed to receive geo-location data points associated with a computing device 110. The data processing system 120 can receive the data points via a computer network 105 via a TCP/IP protocol, cell phone data network, or another communication protocol of computer network 105. The data points can include location information and time information, or the data processing system 120 can determine the location or time information associated with a received data point upon receiving the data point from the computing device 110. The data processing system 120 can also receive an identifier associated with the data point, such as a unique user device identifier, or a username associated with an application executing on the user device 110. In one implementation, an application executing on the user device 110 (e.g., a mobile application, a mobile operating system, a web browser, a map application, etc.) can transmit the geo-location data point that includes the location information. In one implementation, a mobile user device 110 may periodically ping the data processing system 120 or other intermediate system to provide location or time information. In one implementation, a smartphone or other cellular enabled user device 110 can ping a cell phone tower system, which may then provide location or time information to the data processing system 120.

Thus, the data processing system 120 (e.g., via machine learning engine 135) can identify one or more features to facilitate selecting a content item for display. A first feature (or first feature data structure) can include information about a first candidate content item retrieved from data repository 145; a second feature can include information about a second candidate content item retrieved from data repository 145; a third feature can include information about the webpage with which the content item is to be provided; and a fourth feature can include information about the computing device on which the content item is to be displayed or otherwise provided. The machine learning engine 135 can use one or more of these features, or a combination thereof, to facilitate content selection. For example, the machine learning engine 135 can query a model with feature information to determine, estimate, or predict a signal associated with the feature. The signal can be a negative or positive signal. The signal can indicate a predicted level of dislike or annoyance based on the feature or combination of features. The data processing system 120 can use the predicted level of dislike or annoyance to facilitate content selection.

The data processing system 120 can generate a query that includes one or more features and transmit, provide or otherwise access a model to receive a predicted score base on the query. For example, the data processing system 120 can generate a query that includes a combination of features. For example, the data processing system 120 can generate a query that includes a combination of features of the candidate content item. The data processing system 120 can generate a query that includes a combination of features of the webpage. The data processing system 120 can generate a query that includes a combination of features of the computing device. The data processing system 120 can generate a query that includes a combination of features of the candidate content item and one or more of the webpage and the computing device. The query can be in any format configured to query the model trained via the machine learning engine 135. The query can include a data structure format, or include data fields and entries. For example, a query can be: {<feature_name1>, <feature_value1>; <feature_name2>, <feature_value2>; <feature_name3>, <feature_value3>}. For example, a query can be: {website, exampleDOTcom; device_location, California; device_type, mobile_device; candidate_content_item_keyword, pizza}. The data processing system 120 can query a model with this generated query to obtain a predicted score that indicates a predicted level of dislike or annoyance with the candidate content item, and use this predicted or estimated score to adjust an online content item auction or otherwise facilitate content selection.

In some implementations, the machine learning engine 135 can generate, maintain, or update the model. The machine learning engine 135 can use or be configured with one or more machine learning techniques to generate the model. The machine learning technique can include one or more statistical technique, for example, a supervised machine learning technique, neural network, regression technique, linear regression technique, Bayesian estimator, etc. To generate the model, the machine learning engine 135 can obtain feature data and signal data associated with several content item impressions, and train the model using the feature data and corresponding signal data of each of the historical content item impressions. For example, the machine learning engine 135 can be configured with a regression analysis technique that uses a statistical process to estimate the relationship between a feature or combination of features and a signal. The feature or combination of features can be a predictor or independent variable, and the signal can be a dependent variable or a criterion variable that can change as the features are varied. In some cases, the machine learning engine 135 can estimate or determine a conditional expectation of the dependent variable given the independent variables (e.g., an average value of the dependent variable when the independent variables are fixed; or other parameter or metric of the conditional distribution of the dependent variable or signal given the independent variable or feature). The predicted signal can be a function of the independent variables and can be referred to as a regression function. The machine learning engine 135 can further identify, determine or characterize a variation of the dependent variable around the regression function which can be described by a probability distribution. The machine learning engine 135 can use the probability distribution to generate a confidence score in the predicted signal value, or use the probability distribution as the confidence score.

To generate the model, the machine learning engine 135 can receive feedback signals associated with content impressions from computing devices. The feedback signals can be received via an electronic feedback interface presented along with content items (e.g., advertisements) displayed on a webpage. The feedback signals may include binary values (e.g., 0, 1, yes, no, like, dislike, relevant, not relevant, etc.), numeric scores with a range (e.g., level of dislike or annoyance based on a range from 1 to 10, with 10 being highest level of dislike or annoyance, and 1 being highest level of interest or comfort with the content item, or vice versa). The range or scale may include any range or scale, including, e.g., 0 to 10, 1 to 100, 0 to 100, 1 to 20, etc.

The data processing system can determine, identify, or obtain feedback using techniques such as based on browsing behavior or viewing behavior changing determined based on tracking viewing activity of a webpage, biometric sensors such as eye tracking, input/output tracking, etc. For example, quickly scrolling through a page may indicate a higher level of annoyance or dislike with content items on the webpage, as opposed to slowly scrolling through the webpage.

Figure 3A:
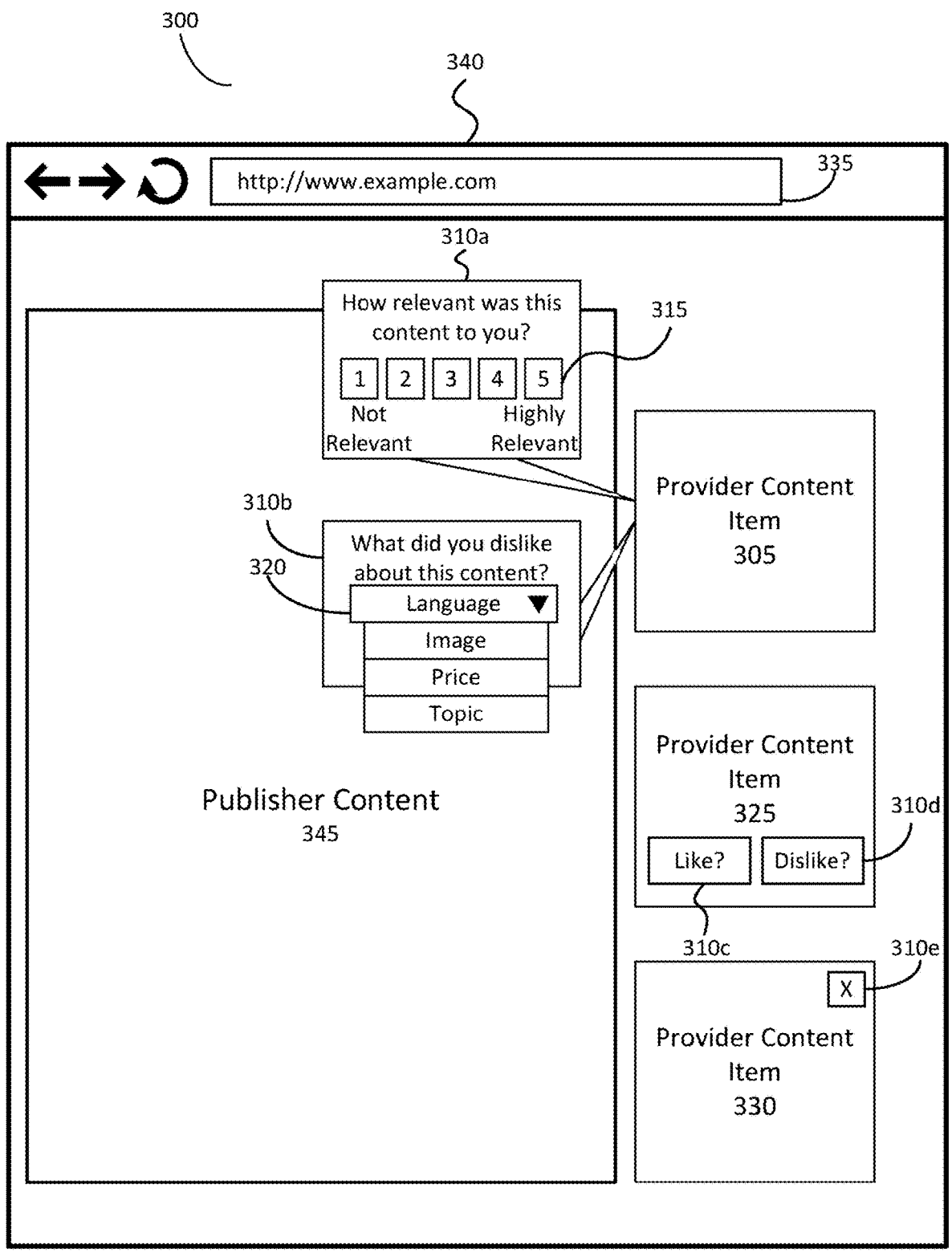
FIG. 3A depicts illustrative electronic feedback interfaces displayed on an electronic document in accordance with an implementation.

The data processing system can also obtain feedback via an electronic survey interface. For example, and with reference to FIG. 3A, the data processing system 120 can provide an online electronic content item for display with a webpage. The webpage with the content items can be provided for display on a computing device. The data processing system 120 can also provide an electronic feedback interface such as an electronic survey interface. FIG. 3A is a block diagram 300 illustrating an implementation of receiving feedback signals via an electronic survey surface. The diagram 300 includes a web browser 340 with an address/URL/IP address text box 335. The web browser can display, render or provide content such as publisher content 345 provided by a content publisher 115, such as an article, blog, images, video, news, game, etc. The web browser 340 can further provide, render, or display content items 305, 325 or 330 from a content provider 125. The content items 305, 325 or 330 can refer to third-party content items, supplemental content items, or advertisements. The provider content item 305, 325 and 330 can be different from the publisher content 345. A content publisher 115 can establish one or more content slots in which the provider content item 305, 325 of 330 is displayed.

The data processing system 120 can select the provider content items 305, 325 and 330 for display with the publisher content 345. The data processing system 120 can receive a request for content and provide the content items for display responsive to the request. The data processing system 120 can further provide one or more electronic survey interfaces 310a-e along with the content item 305, 325, or 330. The electronic survey interfaces 310a-e can be configured to receive a feedback signal associated with the content item impression. One or more electronic survey interfaces 310a-e can be provided along with the content, responsive to an interaction with the content, or based on a trigger event or condition (e.g., scrolling on the webpage, closing the webpage, mouse over the content item, etc.).

The data processing system 120 can provide an instance of an electronic survey interface 310. The data processing system 120 can provide the instance of the electronic survey interface responsive to displaying a content item 305. For example, electronic survey interface 310a can be displayed as a pop-up, notification window, or other user interface element and may overlay at least a portion of the publisher content 345 or provider content item 305. The electronic survey interface 310a can include one or more widgets or buttons to facilitate providing feedback, along with a query. For example, the query can include "How relevant was this content to you?" or "What did you dislike about this content?", etc. The feedback signal can be in the form of a binary value, or a value in a range of values. For example, the range can be a range of values from 1 to 4 or 1 to 5 or 1 to 10 or any other range of vales. A first end in the range can correspond to a first extreme, and a second end in the range can correspond to the opposite extreme. For example, and as illustrated in electronic survey interface 310a, the feedback signal can include a range of values from 1 to 5 315, where 1 refers to not relevant, and 5 refers to highly relevant. Thus, a viewer of content item 305 may receive a prompt to provide feedback for the content item 305 as displayed along with publisher content 305. The data processing system 120 may provide the prompt for feedback via electronic survey interface 310a and can include buttons 315.

In another example, the data processing system 120 can provide electronic survey interface 310b that includes a drop-down menu 320. The dropdown menu 320 can include signals responsive to a prompt or query in the electronic survey interface 310b. For example, if the query is "What did you dislike about this content?", the options for response in the dropdown menu can include, e.g., language of the content item (e.g., English, Spanish, French, or profanity, loud, aggressive, passive, etc.), image (e.g., graphic, scary, unrelated, nudity), price (e.g., too expensive, too cheap, did not include a price), topic (e.g., unrelated, embarrassing, stressful, depressing, etc.).

In some cases, the data processing system 120 can provide an electronic survey interface that appears embedded or overlaid on the content item. For example, content item 325 can include one or more electronic survey interfaces, such as electronic survey interfaces 310c and 310d. In some implementations, the content item 325 may include one or both of 310c and 310d. This form of electronic survey interface can include a button or other widget that appears overlaid on the content item. The button can be solid, transparent, opaque or hover over. The data processing system 120 can vary the translucency of the button based on a type of content item. For example, if the content item 325 includes an image, then the buttons 310c-d can have a solid background or white background to improve the user interface. In another example, the electronic survey interface can include an action widget, such as an "X" box 310e as shown with content item 330. The action widget 310e can refer to closing the content item 330, removing the content item 330, requesting a new or replacement for content item 330, or request to not provide content item 330 in future or subsequent content slots.

Upon receiving an indication or interaction responsive to an electronic survey interface 310a-e via a user interface widget such as 315, 320, 310c, 310d, or 310c, the data processing system 120 can generate a feedback signal with a value and store the feedback signal in data repository 145. The feedback signal received via electronic survey interface 310a-e can be a negative or positive signal. The feedback signal can indicate that a viewer of the content item disliked the content item or that the content item was not relevant to the viewer. The data processing system 120 can determine the feedback signal value based on receiving an indication or user interaction via the electronic survey interface.

Figure 3B:
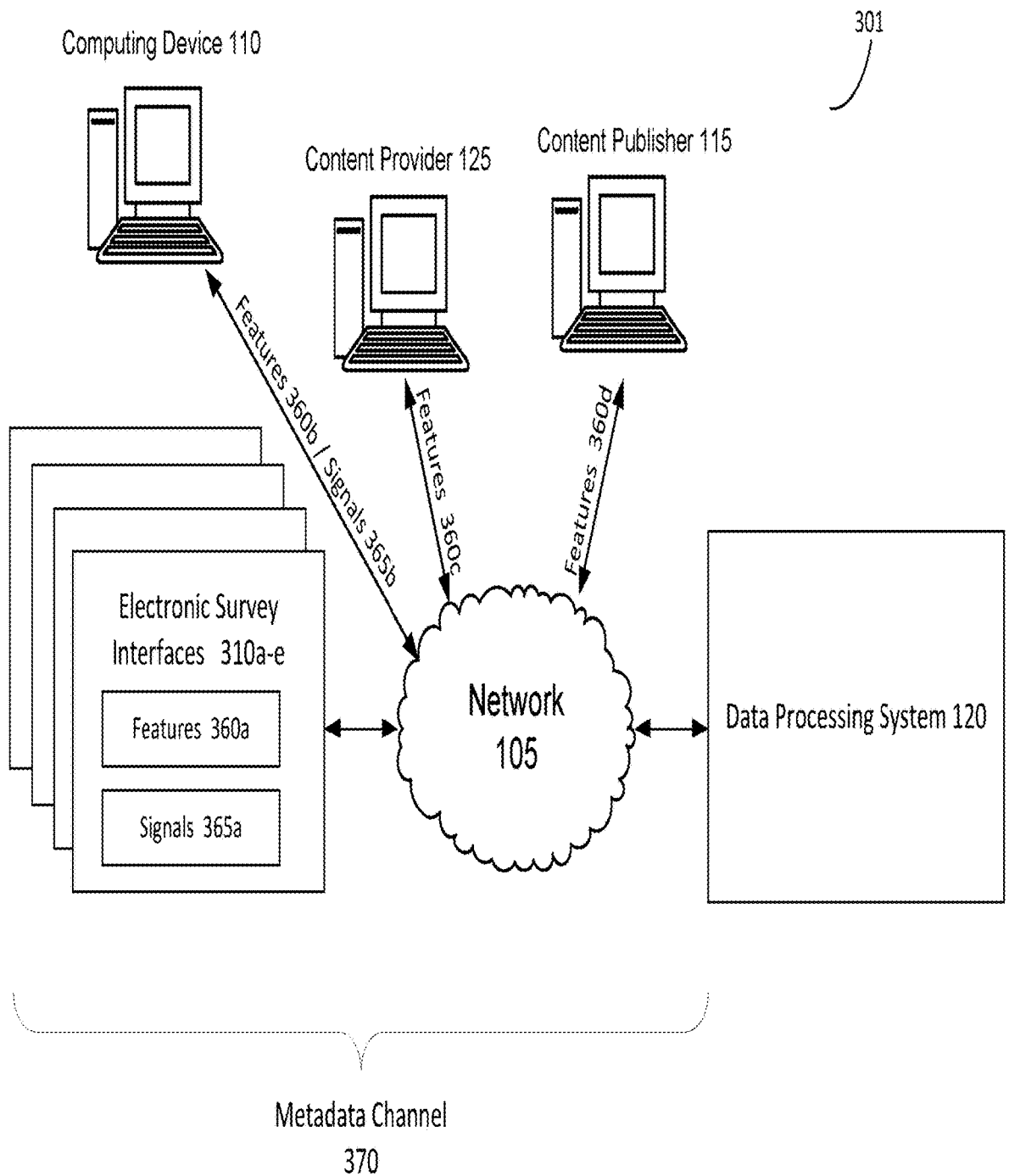
FIG. 3B depicts a system to provide a metadata channel formed from an electronic feedback interface, in accordance with an implementation.

The data processing system 120 can receive the feedback signal via a metadata channel. The metadata channel may include an input formed from the electronic survey interface. The metadata channel can refer to a communication channel over network 105 that receives feedback via the electronic survey interface from a computing device 110, and then transmits or provides the feedback to data processing system 120. FIG. 3B illustrates a system 301 including a metadata channel 370 in accordance with an implementation. The system 301 can include one or more component or functionality illustrated in FIGS. 1, 3A and 4. The system 301 can include the electronic survey interface 310a-e that receives feedback signals 365a. The feedback signals 365a can be input via a computing device 110a. The signals 365a can correspond to the signals 365 input by computing device 110. The computing device 110 can transmit the signals 365a via network 105 to electronic survey interface 310, which may further transmit the feedback signal 365a to data processing system 120. In some cases, the electronic survey interface 310 can be rendered on computing device 110, in which case the computing device 110 can directly communicate the signals to data processing system 120.

In some implementations, the electronic survey interface 310 can include a script, module, or tool that identifies features 360a associated with the webpage, content item, or computing device. The electronic survey interface 310, upon identifying or obtaining the feature, can provide the feature to data processing system 120 via network 105. In some implementations, the computing device 110 can provide features 360b (or data indicative of a feature) to the electronic survey interface 310 or directly to data processing system 120. In some implementations, the data processing system 120 can receive features 360c from a content provider 125, or features 360d from a content publisher 115 via network 105.

The metadata channel 370 can provide data or information that describes, details, or characterizes one or more aspects of the content item impression, including features and signals. The metadata channel 370 can be formed from the electronic survey interface because the electronic survey interface can be an input mechanism of the metadata channel 370. The data processing system 120 can establish the metadata channel responsive to a content item impression on a webpage. For example, when selecting a content item to provide for display with a webpage, the data processing system 120 can select one or more electronic survey interface 310a-e and provide a script, agent, HTML code, or other module to be rendered on the webpage displayed on the computing device 110. When providing the electronic survey interface 310, the data processing system 120 establishes the metadata channel 370 to receive feedback signal via the survey interface. Thus, the metadata channel 370 can refer to data communications received by the data processing system 120 that indicate features or signals associated with a content item impression.

The data processing system 120 can receive one or more features and one or more signals from numerous computing devices during a time interval. For example, the data processing system 120 may receive features and signals for content impressions during a time interval such as the last 24 hours, 48 hours, 72 hours, 1 week, 30 days, 60 days, 90 days, 180 days, 1 year, etc. The data processing system 120 can obtain these historical signals (and corresponding features) and store them in data repository 145. The data processing system 120 can further generate, maintain, train or update a model via the machine learning engine 135 with the historical signals and features. The data processing system 120 can store or maintain the model in data repository 145 and query the model to facilitate subsequent content selection. The data processing system 120 may periodically update or re-train the model with additional signals and corresponding features. For example, the data processing system 120 can update or re-train the model on a daily basis, overnight, weekly, monthly, etc.

After training the machine learning model has been trained with historical signals and corresponding features, the data processing system 120 can query the model (e.g., stored in data repository 145) with one or more features associated with a real-time content item selection. The query can include a combination of features. The data processing system 120 can query the model to obtain an estimated or predicted signal for the features of the query. The data processing system 120 can query the model to obtain an estimated or predicted signal and a corresponding confidence value for the estimate or prediction.

The data processing system 120 can query the model for each candidate content item identified by the content selector to retrieve a score for each candidate item, where the score can be an output of the model, such as a predicted signal, estimated signal, likelihood of dislike/like, confidence, etc. The data processing system 120 can use the score to select one or more candidate content items. For example, the data processing system 120 can query the model with a first feature combination that includes features for the webpage, computing device, and first candidate content item. The model can, responsive to the first feature combination, determine that, based on historical signals that correspond to the features of the first feature combination, the likelihood of dislike or annoyance (or predicted dislike score) in the first candidate content item is 20% or 0.2. The data processing system 120 can further query the model with a second feature combination that includes the same features as the first feature combination, except instead of the first candidate webpage, the features are for ta second candidate webpage. The model can input the second feature combination and determine that the likelihood of dislike or annoyance with the second candidate content item is 70% or 0.7. The data processing system 120 can compare the score 0.2 with the score 0.7 to predict that the first candidate content item has a lower likelihood of being disliked based on the model. The data processing system 120 can use this prediction based on the model to select the first candidate content for display with the webpage.

In some implementations, the data processing system 120 can alter the initial ranking determined by the real-time content item auction based on the predicted dislike score (e.g., the predicted level of dislike or annoyance). For example, the machine learning engine 135 can return the predicted feedback signal to the content selector 130 conducting the real-time content item auction to allow the content selector 130 to adjust a ranking of the candidate content items in the real-time content item auction. The content selector 130 can generate an initial ranking of candidate content items prior to adjusting the ranking based on the predicted feedback signal. For example, the content selector 130 may initially rank the second candidate content item as the highest ranked content item and the first candidate content item as a second ranking content item (or runner up content item). Upon querying the model and receiving the predicted signal, the data processing system 120 can adjust the ranking to determine that the first candidate content item is the highest ranking content item and the second candidate content item is the second ranking content item based on a comparison of the predicted signal scores.

In an illustrative example, the data processing system can adjust the scores using or based on the following function: adjusted_score=initial_score*(1−predicted_dislike_score). In another example, the data processing system can use an exponential function as follows: adjusted_score=initial_score^(1−predicted_dislike_score). In another example, adjusted_score=initial_score^ (1/predicted_dislike_score). In yet another example, data processing system can adjust the score based on: adjusted_score=initial_score+(1−predicted_dislike_score).

In these example, the predicted_dislike_score can be a value between 0 and 1, where 1 indicates a highest level of predicted dislike, and 0 indicates a lowest level of predicted dislike. The data processing system can use one or more techniques for adjusting the score in the auction, thereby potentially adjusting the ranking of content items in the auction.

Thus, for each content item slot and content item request, the data processing system 120 identifies one or more features to query a model to determine a score indicative of a likelihood of dislike or annoyance. The model can include or store weights for the feature or combination of features that were generated based on historical signals and corresponding features. The output or response to the query can include a predicted likelihood of dislike for the particular combination of features. The output can further include a confidence level in the prediction (e.g., indicating a variance or variability of the prediction for the combination of features).

The output of the model can include a numeric value, an alphanumeric value, a letter grade, symbol, character, string, color, flag, binary value, or other indicator. The output can include a weight and a confidence level. In some implementation, the data processing system 120 can combine the weight with the confidence level to adjust the ranking of the online auction content item. The data processing system 120 can adjust the ranking of candidate content items based on a level of confidence in the score output by the model. For example, a first ranked content item has a predicted dislike of 40% with a 90% confidence level and a second ranked candidate content item has a predicted dislike of 37% with a 10% confidence level. The data processing system 120 can determine that the second ranked content item has a lower predicted dislike and adjust the ranking such that the second ranked content item becomes the first ranked content item. In some implementations, the data processing system 120 can determine that the confidence level of the second ranked content item is below a confidence threshold (e.g., 50%, 40%, 30%, 20%, 15%, 10%, 5%, 7%, etc.) and, therefore, determine not to adjust the ranking and, instead, maintain the initial ranking.

In another example, the real-time content item auction can include a third ranked candidate content item with a predicted dislike of 39% with a confidence level of 70%. The data processing system 120 can determine that the confidence level satisfies a confidence threshold (e.g., the confidence level is greater than a threshold), and determine to adjust the ranking in the auction such that the third ranked content item becomes the highest ranked content item.

The data processing system 120 can use a second model to facilitate determine the adjustment based on the predicted dislike value and the confidence level. For example, the data processing system 120 can generate a second model based on feedback signals received for content items selected using the first model. The second model can further take into account the corresponding confidence level. In some implementations, data processing system 120 can base the second model on a click through rate or conversion rate associated with content items selected using the first model, where the features can include a predicted dislike score and confidence level. In some implementations, the first model can include the second model.

In some implementations, the data processing system 120 can weight the predicted signal output from the model based on the confidence level to determine a score used to adjust the ranking of content items in the auction. For example, the data processing system 120 can determine that the score is based on a product of the predicted signal and the confidence level; a ratio of the predicted signal and the confidence level; or a function (e.g., linear, exponential, or logarithmic) of the predicted signal and the confidence level. In some cases, the data processing system 120 can be configured with a function that causes a predicted signal with a low confidence to be less likely to adjust the ranking, or significantly adjust the ranking, as compared to a predicted signal with a higher confidence score. For example, if two candidate content items have the same predicted dislike signal, but the first candidate content item has a high confidence and the second candidate content item has a low confidence, the data processing system 120 may determine to rank the first candidate content item higher.

The data processing system 120 can include a bidding module 140 designed and constructed to determine a price to charge a content provider of a content item that is the highest ranked content item in the real-time online auction and selected for display on a webpage. The bidding module 140 can receive, via the content selector 130 or machine learning engine 135, the predicted score for the selected content item as well as the predicted score for one or more candidate content items that were not selected. The bidding module 140 can determine a price to charge the content provider of the selected content item based on the score of the selected content item and the score of one or more unselected content items. In some cases, the data processing system 120 can select for display multiple content items from the real-time online content item auction (e.g., the top number of ranking content items based on the number of available content slots on the webpage).

In some implementations, the data processing system 120 can charge the content provider of the selected content item a price corresponding to (e.g., equal to or capped at) the max bid price of the content provider. In some implementations, the data processing system 120 can charge the content provider of the selected content item a price corresponding to a max bid price of the second place content item (whether or not this content item was selected for display). In some implementations, the data processing system 120 can charge the content provider of the selected content item a price corresponding to a max bid price of the second place content item (whether or not this content item was selected for display), capped at a max bid price of the winning content provider. In some implementations, the data processing system 120 can determine the max bid price of the second ranked content item, and then determine a price based on the second place max bid price and the predicted signal scores of the highest ranked content item and the second ranked content item. The data processing system 120 can similarly determine the price based on one or more other ranked content items for auctions in which there are numerous candidate content items. For example, the data processing system 120 can determine the max bid price of the second ranked content item based on a third ranked content, and then, in turn, determine the price for the highest ranked content item.

In another example, in which multiple content items are to be placed in multiple content slots or multiple content items are to be placed in a single content slot, the data processing system 120 can determine the price of the highest ranking content item based on a price of multiple other content items. The data processing system 120 can make this determination by initiating, executing, or running the content item auction to determine the predicted dislike value of different configurations of content items, showing one or more content items in the single content item slot. The data processing system 120 can identify, determine or select the configuration of multiple content items in a single content item slot that is estimated to generate the lowest dislike or annoyance value. Further to this example, the data processing system 120 can determine pricing for the selection configuration of content items with the lowest dislike value by re-running the auction without the selected configuration to determine a second place content item configuration, e.g., a new configuration with the lowest dislike value in the auction when the selected configuration is not part of the auction. The data processing system 120 can then determine the price based on the dislike value (or other auction score) of the selected configuration and the dislike value (or other auction score) of the second place configuration.

In some implementations, the data processing system 120 can include a price model used to determine a price to charge a content provider based on one or more of a predicted dislike score and a corresponding confidence level. For example, the data processing system 120 can charge a content provider more or less depending on the confidence level. In some implementations, the data processing system 120 can charge a content provider a higher price if the confidence level is low. In some implementations, the data processing system 120 can charge a content provider a lower price if the predicted feedback signal indicates a low likelihood of dislike, as compared to if the predicted feedback signal indicates a high level of dislike.

In some implementations, the data processing system 120 (e.g., via bidding module 140) can determine a price for the selected content item based on a comparison, difference or function of a first score of the content item and a second score of a second candidate content item. The first and second score can refer to the predicted dislike score output by the machine learning model, or a score based on a combination of the predicted dislike score and a confidence level. The bidding module 140 can adjust the price based on comparing scores from more than two candidate content items in the auction.

The data processing system 120 can determine the price to charge a content provider based on the predicted dislike score of the content item or the predicted dislike scores of multiple candidate content items in the real-time online auction. For example, a content item associated with a higher predicted dislike score (e.g., more likely that a user will dislike the content item) may result in a lower click through rate or conversion rate, thereby resulting in less revenue. However, a content item associated with a lower predicted dislike score (e.g., less likely that a user will dislike the content item; or more likely that a user will like the content item), may result in higher click through rate or conversion rate, thereby resulting in greater revenue. Thus, the data processing system 120 can charge a content provider associated with a high predicted dislike score more for displaying their content item as compared to a content provider with a content item associated with a low predicted dislike score.

To determine the price to charge a content provider, the data processing system 120 can, in some implementations, determine a predicted likelihood score of a first candidate content item by querying a model with features associated with the request for content and the first candidate content item. The data processing system 120 can further determine a predicted likelihood score of a second candidate content item by querying a model with features associated with the request for content and the second candidate content item. Using the first and second scores output by the model responsive to the request, the data processing system 120 can adjust a ranking of the first and second candidate content items in an online real-time auction. The data processing system 120 can further adjust a price to charge the content provider of the highest ranked content item based on the predicted score or a comparison of the predicted score relative to other predictive scores or a threshold.

For example, the data processing system 120 can determine a price to charge the content provider of the highest ranked (or selected) content item by converting or translating the predicted dislike score into a monetary unit or value. The data processing system 120 can use a function to perform the conversion from the predicted dislike score to a monetary unit. The data processing system 120 can use a revenue model to determine the price. To determine the price, the data processing system 120 can retrieve, from a data repository, a baseline price or base bid price associated with the content item or content provider. The data processing system 120 can retrieve from the data repository a function used to determine a price to charge the content provider. For example, the function may include a proportional relation between a level of predicted dislike and an amount by which to modify the base price, whereby the higher the predicted level of dislike, the higher the price. For example, the price function can be based on the following equation: price=base_price ($)+($1.0×predicted dislike), where the predicted dislike is a value between 0 and 1, with 1 indicting a highest predicted dislike, and 0 indicating lowest level of dislike. Thus, the amount by which the data processing system 120 increases the base price can be proportional to the amount of dislike. In another example, the amount by which the data processing system 120 increases the base bid price can be based on the following equation: price=base_price ($)+($A×predicted dislike), where A is a predetermined multiplier. The predetermined multiplier can be set by an administrator of the data processing system 120, or be based on a model maintained, generated, or trained by the machine learning engine 135.

In another example, the data processing system 120 can determine the price based on a difference between the predicted score of the selected content item and a second place content item in the auction using the following function: price=base_price+$A×(first_predicted_score−second_predicted_score). The base_price can refer to a max bid price of the second place content item, such as in a second price online content item auction. With this function, the data processing system 120 can charge the content provider of the selected content item more or less depending on the predicted dislike score relative to the second place content. For example, the max bid of the selected content item may be $1.00; the max bid of the second place content item may be $0.50; the first predicted dislike score of the selected content item can be 0.6; and the second predicted dislike score of the second place content item=0.4. In this example, the second place content item that is not selected has a lower predicted dislike score. Thus, the data processing system 120 can apply the function as follows: price=$0.5+$1×(0.6−0.4)=$0.7. Thus, the data processing system 120 can increase the price of the selected content item due to a higher predicted dislike score for the selected content item relative to the dislike score for a second place or unselected content item. This may reflect that the data processing system 120 can charge more for a content item that is likely to generate lower revenue due to a greater likelihood of being disliked or annoying. In another example, if the first predicted dislike score is 0.2, the data processing system 120 can apply the function as follows: price=$0.50+$1×(0.2−0.4)=$0.3. Thus, if the predicted dislike score of the selected content item is less than the predicted dislike score of the second place content item, then the data processing system 120 can reduce the price charged to the content provider. This may reflect that the data processing system 120 can generate greater revenue from a content item with a lower predicted dislike.

Thus, the data processing system 120 can adjust a ranking of candidate content items and a price to charge a content provider of a selected content item based on historical feedback signals indicating a level of dislike or annoyance corresponding to one or more features associated with the content item or request for content.

Figure 2:
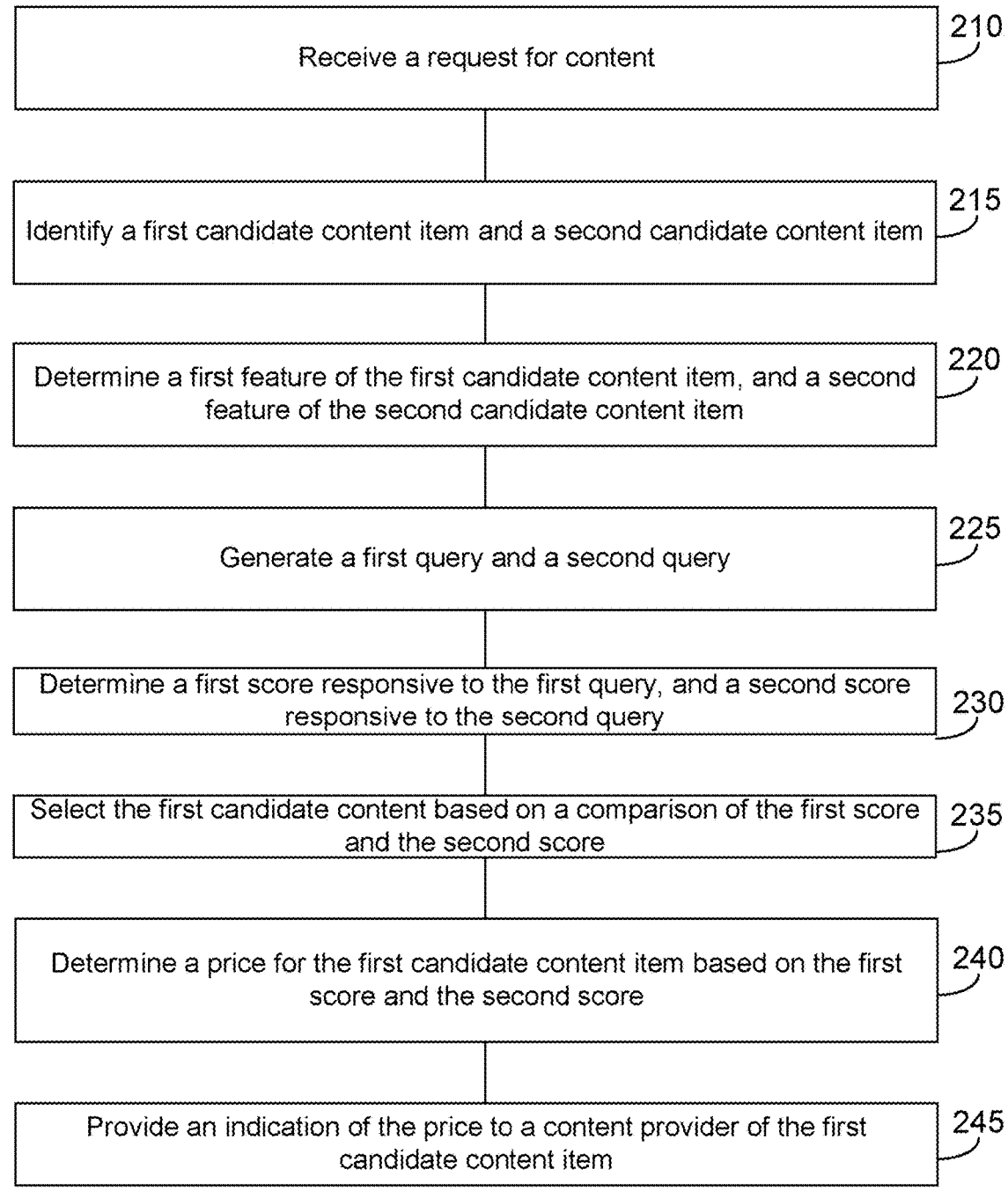
FIG. 2 depicts a method for selecting content based on survey feedback received via a computer network in accordance with an implementation.

FIG. 2 illustrates a method 200 for selecting content based on survey feedback received via a computer network in accordance with an implementation. The method 200 can be performed by system 100, system 301, data processing system 120, computing system 400, or one or more component thereof. In some implementations, the method 200 can include a data processing system receiving a request for content at block 210. At block 215, the data processing system can identify a first candidate content item and a second candidate content. The first and second candidate content item can be identified based on the request content item. At block 220, the data processing system can determine a first feature of the first candidate content item. The data processing system can also determine a second feature of the second candidate content item. At block 225, the data processing system can generate a first query with the first feature and a second query with the second feature. At block 230, the data processing system can, using a model, determine a first score responsive to the first query, and determine a second score responsive to the second query. At block 235, the data processing system can select the first candidate content item to be the content item or selected content item based on a comparison of the first score and the second score. At block 240, the data processing system can determine a price for the first candidate content item based on the first score and the second score. At block 245, the data processing system can provide an indication of the price to a content provider of the first candidate content item.

Still referring to FIG. 2, and in further detail, the data processing system can receive a request for content at block 210. The request can be to display content with a webpage rendered on a computing device. In some cases, the data processing system may not receive a separate request for a content item, but may determine to display or provide the content item for display with the webpage. The data processing system can receive additional information with the request. For example, the request may indicate a URL of the webpage, keywords of the webpage, an identifier associated with the computing device, time of day, content slot information, etc.

At block 215, the data processing system (e.g., via content selector) can identify a first candidate content item and a second candidate content. The first and second candidate content item can be responsive to the request. In some implementations, the data processing system can identify one or more candidate content items by matching data associated with the web page, request or computing device with content selection criteria associated with the candidate content item. For example, the data processing system can match a keywords of the webpage with keywords of content items to identify candidate content items. The data processing system, upon identifying multiple candidate content items, can initiate a real-time online content item auction. The auction can be real-time because the data processing system can conduct the auction during content selection, responsive to a request for content, or during or overlapping with rendering of a webpage.

At block 220, the data processing system can determine a first feature of the first candidate content item. The data processing system can also determine a second feature of the second candidate content item. The data processing system can determine a third feature of a webpage. The data processing system can determine a fourth feature of a computing device. Features may include information that can facilitate content selection. Example features associated with a content item can include keywords, type of content item (e.g., text, image, video, audio, search advertisement, popup window, banner advertisement, mobile advertisement, desktop advertisement), topic, concept, content vertical, rating, language, etc. Example features associated with a webpage can include keywords, domain name, topic, concept, position of content slot, rating (e.g., profanity), language (e.g., English, French, etc.), scripts run on the webpage, etc. Example features associated with a computing device can include location, time of day, network used to access the webpage (e.g., WiFi, cellular network, Bluetooth, wireless hotspot, wired Ethernet), type of computing device (e.g., laptop, smartphone, wearable device, tablet, desktop), operating system, system specifications, etc.

At block 225, the data processing system can generate a first query with the first feature and a second query with the second feature. The data processing system can generate the first query to include one or more features associated with one or more of the first candidate content item, webpage or the computing device. The first query can include a combination of some or all feature information the data processing system can identify, obtain, or determine. For example, a query can include a feature combination: {keyword_content_item, pizza; content_item_type, text_advertisement; content_item_location_criteria, California; webpage, example_com; web_page_scripts, multimedia graphics script; web_page_keyword, food; computing_device_type, mobile_device}. To create the query, the data processing system can retrieve information from a data repository or other resources accessible via a network. For example, the data processing system can determine the webpage address and then parse the webpage to identify keywords, location information, concepts, executed scripts, language, profanity, etc.

At block 230, the data processing system can, using a model, determine a first score responsive to the first query, and determine a second score responsive to the second query. The data processing system can determine the score using a model generated, maintained, or trained by a machine learning engine. The model may include a machine learning model. The machine learning engine can train the model with historical signals received from a plurality of computing devices via a metadata channel formed from an electronic survey interface. For example, when a content item is displayed on a webpage, the data processing system can provide an electronic survey interface configured to receive input from a computing device. The electronic survey interface can include input widgets such as buttons, dropdown menus, dials, input text boxes, drag-and-drop features, gestures, touch gestures, etc. In some implementations, the electronic survey interface can be configured to receive input via gestures such as by shaking, moving, or rotating the computing device. Example electronic survey interfaces are illustrated in FIG. 3A.

The data processing system can receive the feedback signals via the metadata channel having an input formed via the electronic survey interface. The metadata channel can convey, transmit or otherwise communicate the feedback signals or information input via the electronic survey interface to the data processing system. The metadata channel can refer to communication of information or data about or associated with the content impression. The electronic survey interface can format or configure information, such as the feedback signal, for delivery via the metadata channel to the data processing system. A script, agent, module, executable file, HTML code, or other component can generate the electronic survey interface.

The data processing system can generate the machine learning model using historical feedback signals. The data processing system can receive the historic signals from multiple computing devices in response to instances of the electronic survey interface provided with previously displayed content items. For example, the data processing system can provide an instance of the electronic survey interface responsive to displaying a content item. In some cases, the data processing system can provide the instance of the electronic survey interface at least partially overlaid on a content item displayed with the web page on the computing device. The data processing system can receive feedback signals via a metadata channel formed from the instance of the electronic survey interface. The feedback signal can be input via the computing device. The data processing system can generate, maintain, train or update the machine learning model using the historical signals and corresponding features. For example, the data processing system can use a statistical model or supervised machine learning model such as, e.g., a neural network, linear regression technique, a Bayesian estimator, etc., to generate the model.

At block 235, the data processing system can select the first candidate content item to be the content item or selected content item based on a comparison of the first score and the second score. The data processing system can use the scores to adjust the ranking of candidate content items in the online auction in order to determine a highest ranking content item. In some cases, the ranking adjusted based on the scores can be different from the initial ranking, while in some cases the adjusted ranking of one or more candidate content items can be different from the initial ranking.

The data processing system can adjust the ranking using the score. The data processing system can adjust the ranking using a score and corresponding confidence value for the score. For example, the data processing system can be configured with a function, heuristic technique, or weighting technique. In one example, the data processing system can determine an initial score for each candidate content item in the auction, and combine the initial score with the score from the model to generate a modified score. The data processing system can modify the initial auction score by multiplying the auction score with the model score, summing the auction score with the model score, applying a function (e.g., linear, quadratic, exponential, logarithmic) to the auction score and model score, etc.

Table 1 is an illustrative example of a content item score generated from the initial auction, a model score output from the model responsive to a query with a feature combination, and a modified content item score. In this example, the data processing system can be configured with the following function to combine the score: Adjusted_Score=Initial_Auction_Score*(1−Predicted_Dislike_Signal), where the predicted_dislike_signal is a value equal to or between 0 and 1, where 1 represents the highest predicted dislike, and 0 represents the lowest predicted dislike.

TABLE 1

Illustrative example of adjusting rank in an online content item auction.

|  | Initial Auction Score | Predicted Dislike Score Output from Model | Adjusted Content Item Score |
|---|---|---|---|
| Candidate Content Item 1 | 0.5 | 0.6 | (0.5) × (1 − 0.6) = 0.2 |
| Candidate Content Item 2 | 0.4 | 0.4 | (0.4) × (1 − 0.4) = .24 |
| Candidate Content Item 3 | 0.3 | 0.3 | (0.4) × (1 − 0.3) = 0.21 |

As illustrated in Table 1, the initial ranking of the content items in the auction is as follows: Candidate content item 1 was ranked highest; candidate content item 2 was in the middle; and candidate content item 3 was ranked lowest. However, after modifying the online content item scores with the predicted dislike signal, the data processing system adjusts the ranking as follows: Candidate content item 2 is ranked highest; candidate content item 3 is ranked in the middle; and candidate content item 1 is ranked the lowest. Thus, the data processing system can adjust the initial ranking in an online content item auction based on predicted dislike scores using a model generated from historic feedback signals received via a metadata channel having an input formed from an electronic survey interface.

At block 240, the data processing system (e.g., via a bidding module) can determine a price for the first candidate content item based on the first score and the second score. The data processing system can determine the price based on an estimated loss of revenue due to a high predicted dislike score. The first estimated loss of revenue can include or take into account a loss of long term revenue. For example, a candidate content item can have a high initial auction score, which can be based on content selection criteria and other matching characteristics. However, the model generated via the historical feedback signals may indicate a high predicted dislike or annoyance with the content item. A high predicted dislike or annoyance may indicate that a user may visit the webpage less, or may install or configure a content item blocking agent or web browser extension (e.g., an advertisement blocker or pop-up blocker), thereby resulting in a loss of future revenue. The data processing system may select the content item for display due at least in part to the high initial auction score, but may charge the content provider a higher price due to the high predicted dislike or annoyance. For example, the price can be based on the second price of the second ranked content item and a predicted dislike of the second content item as follows: price=base_price+(first_predicted_dislike score−second_predicted_dislike_score). Therefore, a higher predicted dislike can result in the data processing system charging a higher price to the content provider.

In some implementations, the data processing system can convert the predicted dislike score to a monetary unit based on an estimated loss of revenue. The estimated loss of revenue can include or take into account a loss of long term revenue. The data processing system can access a loss of revenue model that is based on historic click through rates of conversion rates correlated with predicted dislike scores. For example, the data processing system can include an impression record for a content item impression record that indicates whether a content item was selected or not. The impression record can also include information about a predicted dislike score associated with the content item impression. The data processing system can retrieve the impression record from a data repository. The data processing system can determine, based on the predicted feedback signal and the selection information in the impression record a correlation between a predicted dislike signal and a click through rate. For example, the data processing system can determine that a low predicted dislike score is correlated with a low click through rate. The data processing system can determine a function or correlation based on the historic data in the impression records to identify a loss of revenue for the data processing system or content provider associated with a reduced click through rate or conversion rate. Thus, the data processing system may determine that a low predicted dislike score is correlated with a low click through rate, which corresponds to an amount of loss of revenue (e.g., loss of a long term revenue) for the data processing system. The data processing system may then use the estimated loss of revenue to determine a monetary unit or value for the predicted dislike score.

In an illustrative implementation, the data processing system can determine that a predicted dislike score of 0.4 corresponds to an average click through rate of 100 selection out of 1000 impressions; while a predicted dislike score of 0.2 corresponds to an average click through rate of 1 selection out of 1000 impressions. The data processing system can further determine that each selection generates $0.01 revenue for the data processing system. Thus, the data processing system may further determine that a predicted dislike score of 0.4 corresponds to $1 of monetary value for every 1000 impressions, while a predicted dislike score corresponds to $0.01 of monetary value for every 1000 impressions. Thus, the conversion of predicted dislike score to monetary units may be $1 and $0.01. Further, the data processing system may use this converted monetary unit to determine a price to charge for the content item. For example, the data processing system may determine to charge the content provider for the loss of revenue to the data processing system, or a portion thereof. For example, the data processing system can charge a price of $0.99 to compensate for the loss of revenue, or some other amount to offset the cost, based on a max price set by the content provider.

At block 245, the data processing system can provide an indication of the price to a content provider of the first candidate content item. The data processing system can deduct the price from an electronic financial account of the content provide. The data processing system can generate a report indicating the price charged for the content item. The data processing system can provide the report via a graphical user interface associated with a content campaign of the content provider. The data processing system can automatically deduct the price from an electronic account of the content provider in real-time, based on a time interval, or in a batch process.

Figure 4:
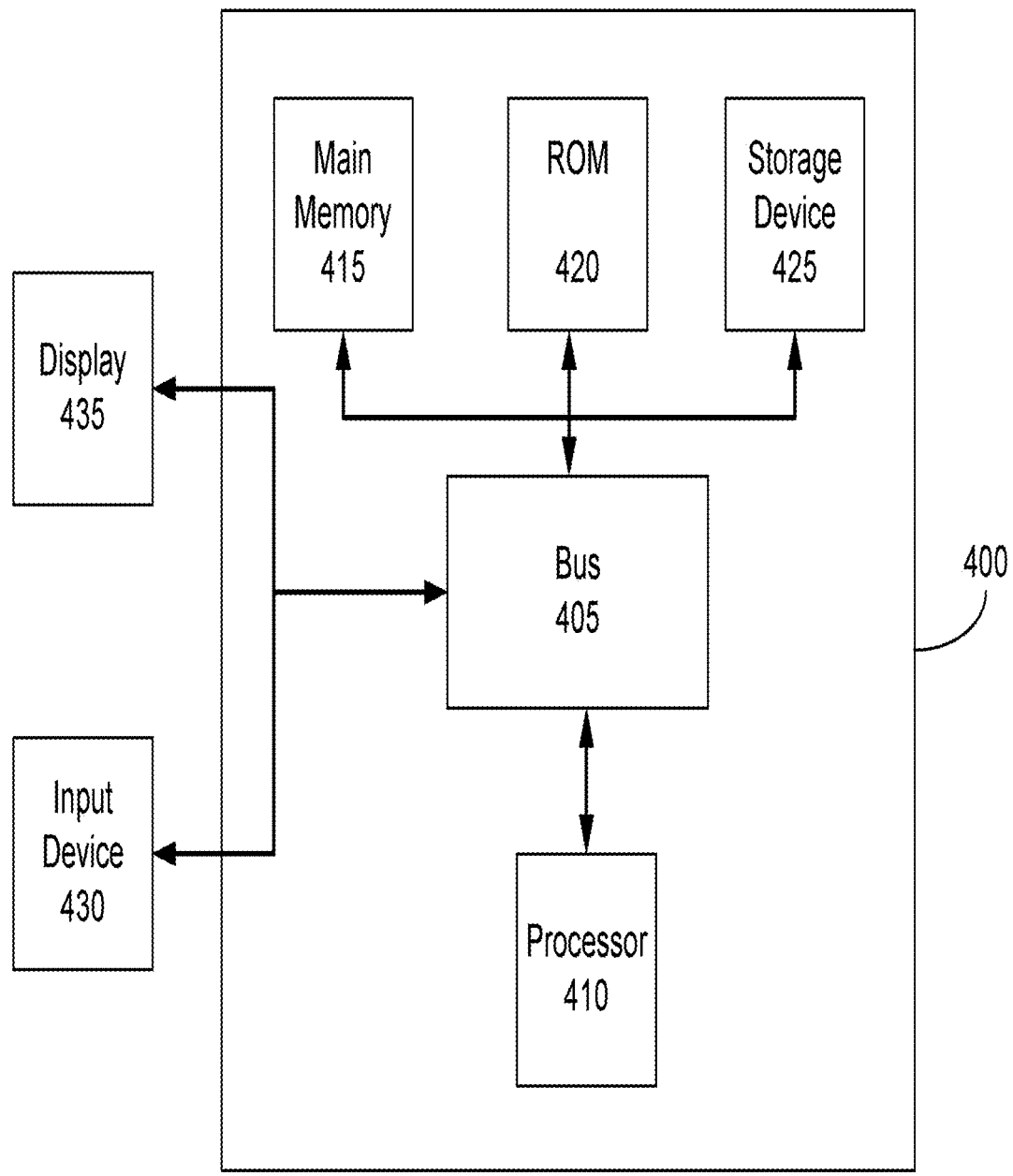
FIG. 4 is a block diagram illustrating a general architecture for a computer system that may be employed to implement various elements of the system shown in FIGS. 1 and 3B, the interface shown in FIG. 3A, and the method shown in FIG. 2, among others, in accordance with an implementation.

Referring now to FIG. 4, a block diagram of a computer system 400 in accordance with an illustrative implementation is shown. The computer system or computing device 400 can be used to implement the system 100, interface 300, system 301, content provider 125, computing device 110, content publisher 115, data processing system 120, content selector 130, machine learning engine 135, bidding module 140, and data repository 145. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
providing, by a data processing system comprising one or more processors and memory, via a computing network, for display on a computing device, a content item associated with an actionable object, which when selected, causes the computing device to:
present a plurality of interactive elements each corresponding to a different one of a plurality of reasons for restricting the content item,
receive an indication of an interaction of a user with at least one interactive element of the plurality of interactive elements,
transmit a signal to the data processing system identifying the interaction of the user with the at least one interactive element, and
restrict the display of the content item on the computing device associated with the user in accordance with the received indication;
receiving, by the data processing system, from the computing device, (i) data corresponding to the signal identifying the interaction of the user with the at least one interactive element and (ii) an identifier identifying the content item, the received data indicating a particular reason, of the plurality of reasons, for restricting the content item, and the particular reason corresponding to a particular interactive element, of the plurality of interactive elements, that was selected by the user; and
updating, by the data processing system and using the received data, a content selection model for selecting content items, wherein the content selection model is associated with the user.

2. The method of claim 1, wherein the content item is a first content item, and the method further comprises:
receiving, by the data processing system, a request for content from the computing device; and
selecting, by the data processing system, a second content item using the updated content selection model.

3. The method of claim 1, wherein the content selection model is updated based on a plurality of signals received from the computing device.

4. The method of claim 1, wherein:
the content provider is a first content provider;
the content item is selected from a first subset of content items associated with the first content provider, and the method further comprises:
selecting, by the data processing system using the updated content selection model, one or more content items from a second subset of content items associated with a second content provider different from the first subset associated with the first content provider, the one or more content items for display on the computing device.

5. The method of claim 1, further comprising:
determining, by the data processing system, a likelihood of interaction corresponding to one or more content items from a list of candidate content items based on historical content item impressions from a plurality of computing devices; and
selecting, by the data processing system, for display on the computing device, the content item based on the likelihood of interaction.

6. The method of claim 1, wherein the content item is a first content item and the actionable object is a first actionable object, wherein the data corresponding to the signal further identifies a request for content, and the method further comprises:
selecting, by the data processing system, responsive to receiving the data from the computing device, using the updated content selection model, a second content item from a list of candidate content items for display on the computing device, the second content item is presented with a second actionable object.

7. The method of claim 1, wherein each content item from a list of candidate content items is associated with a rank indicative of likelihood of interaction by the computing device, and the method further comprises:
decreasing, by the data processing system, responsive to receiving the data corresponding to the signal identifying the interaction with the at least one interactive element and the identifier identifying the content item, the rank of the content item of the list of candidate content items.

8. The method of claim 7, wherein the content item is a first content item and the signal is a first signal, wherein the list of candidate content items includes the first content item and a second content item, and the method further comprises:
receiving, by the data processing system, from the computing device, data corresponding to a second signal identifying an interaction with the second content item and an identifier identifying the second content item; and
increasing, by the data processing system, responsive to receiving the data corresponding to the second signal, the rank of the second content item of the list of candidate content items.

9. The method of claim 1, wherein the actionable object, when selected, causes the computing device to present at least one of an input text box, input button, or input drop down menu, wherein the selection of the actionable object is indicative of a command to cause the computing device to restrict the display of the content item on the computing device.

10. The method of claim 1, wherein the content item is selected from a list of candidate content items for display, and the method further comprises:
transmitting, by the data processing system, instructions to the computing device to cause the computing device to restrict the content item from display in response to receiving the data corresponding to the signal; and
removing, by the data processing system, the content item from the list of candidate content items.

11. The method of claim 1, wherein the content item is a first content item and the method further comprises:
selecting, by the data processing system, a second content item from a list of candidate content items in response to receiving the data corresponding to the signal identifying the interaction with the at least one interactive element and the identifier identifying the content item; and
transmitting, by the data processing system, responsive to selecting the second content item, instructions to the computing device to cause the computing device to replace the first content item with the second content item.

12. The method of claim 1, wherein the content item is a first content item, and the method further comprises:
training, by the data processing system, the content selection model based the data corresponding to the signal identifying the interaction with the at least one interactive element and the identifier identifying the content item; and updating, by the data processing system, using the trained content selection model, a list of candidate content items to select a second content item for display.

13. A system, comprising:

a data processing system comprising one or more processors and memory, the data processing system configured to:

provide, for display on a computing device, a content item associated with an actionable object, which when selected, causes the computing device to:

present a plurality of interactive elements each corresponding to a different one of a plurality of reasons for restricting the content item, receive an indication of an interaction of a user with at least one interactive element of the plurality of interactive elements, transmit a signal to the data processing system identifying the interaction of the user with the at least one interactive element, and restrict the display of the content item on the computing device associated with the user in accordance with the received indication;

receive, from the computing device, (i) data corresponding to the signal identifying the interaction of the user with the at least one interactive element and (ii) an identifier identifying the content item, the received data indicating a particular reason, of the plurality of reasons, for restricting the content item, and the particular reason corresponding to a particular interactive element, of the plurality of interactive elements, that was selected by the user; and update, using the received data, a content selection model for selecting content items, wherein the content selection model is associated with the user.

14. The system of claim 13, wherein the content item is a first content item, and wherein the data processing system is further configured to:

receive a request for content from the computing device; and select a second content item using the updated content selection model.

15. The system of claim 13, wherein the content selection model is updated based on a plurality of signals received from the computing device.

16. The system of claim 13, wherein:

the content provider is a first content provider;

the content item is selected from a first subset of content items associated with the first content provider, and wherein the data processing system is further configured to:

select, using the updated content selection model, one or more content items from a second subset of content items associated with a second content provider different from the first subset associated with the first content provider, the one or more content items for display on the computing device.

17. The system of claim 13, wherein the data processing system is further configured to:

determine a likelihood of interaction corresponding to one or more content items from a list of candidate content items based on historical content item impressions from a plurality of computing devices; and select, for display on the computing device, the content item based on the likelihood of interaction.

18. The system of claim 13, wherein the content item is a first content item and the actionable object is a first actionable object, wherein the data corresponding to the signal further identifies a request for content, and wherein the data processing system is further configured to:

select, responsive to receiving the data from the computing device, using the updated content selection model, a second content item from a list of candidate content items for display on the computing device, the second content item is presented with a second actionable object.

19. The system of claim 13, wherein each content item from a list of candidate content items is associated with a rank indicative of likelihood of interaction by the computing device, wherein the content item is a first content item and the signal is a first signal, wherein the list of candidate content items includes the first content item and a second content item, and wherein the data processing system is further configured to:

decrease, responsive to receiving the data corresponding to the signal identifying the interaction with the at least one interactive element and the identifier identifying the content item, the rank of the content item of the list of candidate content items;

receive, from the computing device, data corresponding to a second signal identifying an interaction with the second content item and an identifier identifying the second content item; and increase, responsive to receiving the data corresponding to the second signal, the rank of the second content item of the list of candidate content items.

20. The system of claim 13, wherein the actionable object, when selected, causes the computing device to present at least one of an input text box, input button, or input drop down menu, wherein the selection of the actionable object is indicative of a command to cause the computing device to restrict the display of the content item on the computing device.

* * * * *